United States Patent [19]

Yamashita et al.

[11] Patent Number: 4,958,538
[45] Date of Patent: Sep. 25, 1990

[54] METHOD AND APPARATUS FOR CONTROLLING LINE PRESSURE OF CONTINUOUSLY VARIABLE TRANSMISSION SYSTEM

[75] Inventors: Yoshinori Yamashita; Sadayuki Hirano; Katsuaki Murano, all of Shizuoka; Takumi Tatsumi; Hiroaki Yamamoto, both of Hyogo, all of Japan

[73] Assignees: Suzuki Jidosha Kogyo Kabushiki, Shizuoka; Mitsubishi Denki Kabushiki Kaisha, Tokyo, both of Japan

[21] Appl. No.: 229,900

[22] Filed: Aug. 8, 1988

[30] Foreign Application Priority Data

Aug. 10, 1987 [JP] Japan ................. 62-199415

[51] Int. Cl.$^5$ ........................ B60K 41/22; B60K 41/14
[52] U.S. Cl. .................................... 74/866; 192/85 R
[58] Field of Search ............... 74/866, 867; 192/85 R, 192/103 F, 109 F

[56] References Cited

U.S. PATENT DOCUMENTS 3,674,121  7/1972  Copeland ............... 192/85 R X
4,592,457  6/1986  Cadee ..................... 192/103 F X
4,665,773  5/1987  Hiramatsu ..................... 74/866
4,674,609  6/1987  Sturges et al. ............... 192/103 F X
4,724,724  2/1988  Tezuka ....................... 74/866
4,727,472  2/1988  Deutsch et al. ................. 74/866 X
4,757,886  7/1988  Brown et al. ............... 192/103 F X
4,805,750  2/1989  Nitz ....................... 192/103 F X

FOREIGN PATENT DOCUMENTS 186656   11/1982  Japan .
43249    3/1984  Japan .
77159    5/1984  Japan .
233256   10/1986  Japan .
2122710  1/1984  United Kingdom ............ 192/103 F Primary Examiner—Leslie A. Braun
Assistant Examiner—Harold F. Macris
Attorney, Agent, or Firm—Flynn, Thiel, Boutell & Tanis

[57] ABSTRACT

A method and apparatus for controlling line pressure of a belt-type continuously variable transmission system. The apparatus controls line pressure by raising it by a specific amount in the presence of predetermined conditions when slipping of a clutch is detected during the drive mode of the system so that optimum clutch engagement can eventually be implemented.

9 Claims, 3 Drawing Sheets

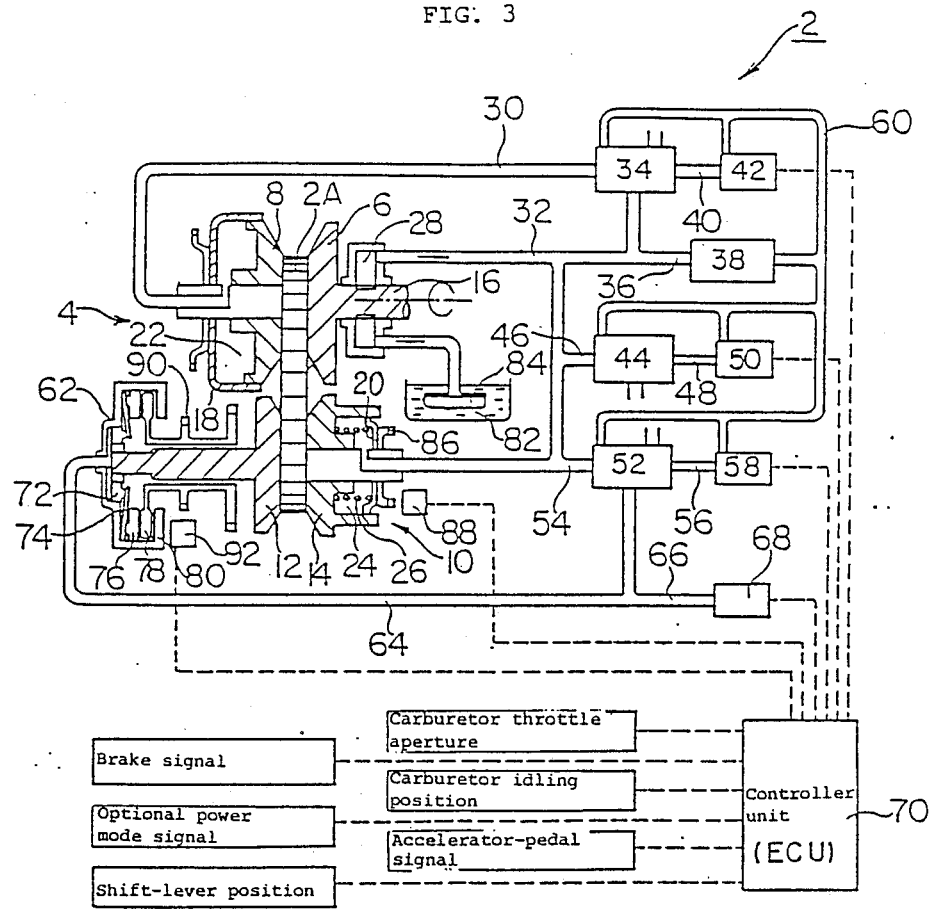

METHOD AND APPARATUS FOR CONTROLLING LINE PRESSURE OF CONTINUOUSLY VARIABLE TRANSMISSION SYSTEM

CROSS REFERENCE TO RELATED APPLICATIONS

This application is related to our copending applications filed concurrently herewith and entitled (1) METHOD OF CONTROLLING CONTINUOUSLY VARIABLE TRANSMISSION SYSTEM (U.S. Ser. No. 229,899), (2) METHOD OF CONTROLLING CLUTCH OR CONTINUOUSLY VARIABLE TRANSMISSION SYSTEM (U.S. Ser. No. 229,909), (3) METHOD OF CONTROLLING CLUTCH PRESSURE OF CONTINUOUSLY VARIABLE TRANSMISSION SYSTEM (U.S. Ser. No. 229,893), and (4) HYDRAULIC CONTROL METHOD FOR CONTINUOUSLY VARIABLE SPEED CHANGE GEAR MECHANISM FOR A VEHICLE AND A DRIVE CONTROL METHOD FOR A PRESSURE VALVE THEREOF (U.S. Ser. No. 229,942). The disclosures of these copending applications are incorporated herein by reference.

FIELD OF THE INVENTION

The present invention relates to a method and apparatus for controlling a continuously variable transmission system. More particularly, it relates to the method and apparatus for controlling line pressure of a continuously variable transmission system which features: control in which the line pressure is raised by a specific amount only when slipping of the oil-pressure-driven clutch is detected during drive mode, provision of a very low safety margin for the objective line pressure, prevention of unnecessary raises in line pressure, simplified constitution of the entire system, and low cost.

BACKGROUND OF THE INVENTION

A conventional vehicle is provided with a transmission system between the internal combustion engine and driving wheels. A conventional transmission system varies the driving force and the speed of wheels in accordance with widely variable driving conditions of the vehicle itself to allow the engine to fully exert its own performance. In conjunction with the transmission system, there are a variety of continuously variable transmission systems like those which are disclosed in official publications of Japanese Patent Laid-Open Nos. 57-186656 (1982), 59-43249 (1984), 59-77159 (1984), and 61-233256 (1986) for example. Any of these conventional continuously variable transmission systems transmits the driving force by either expanding or contracting the radius of rotation of a belt by either expanding or contracting the width of channel formed between a stationary pulley member secured to a revolving shaft and a movable pulley member mounted axially movably on the revolving shaft so that the movable pulley member can come into contact with and leave the stationary pulley member for varying the belt drive ratio.

Conventional continuously variable transmission systems leave the following problem. In drive mode, a conventional continuously variable transmission system executes control of the objective line pressure by determining the objective line pressure in anticipation of a certain safety margin value when an oil-pressure-driven clutch does not slip itself, while the actual line pressure is controlled to follow the objective line pressure by applying closed-loop control means. A convention line pressure control system sets the objective line pressure to allow the oil-pressure-driven clutch to slip itself before the pulley belt slips, and as a result, the belt can be prevented from incurring wear.

Nevertheless, when operating the line-pressure control system mentioned above, even though the line pressure is controlled to follow the objective clutch pressure, due to variable clutch characteristics or differences between different clutch units, clutch slipping may still take place. In addition, a certain difference can be generated between the objective line pressure and the actual one due to the presence of a variety of uncertain factors, including an unsatisfactory initial characteristic of the pressure sensor detecting the clutch pressure in contrast with the designed value, degradation of such characteristic after years of service, or faulty symptoms caused by external stress, thus eventually generating unwanted slipping of the clutch itself. To solve those problems, conventional line-pressure control systems introduce a substantial safety margin to the objective line pressure.

On the other hand, conventional line-pressure control systems need to use closed-loop control so that the actual line pressure can match the objective line pressure which is provided at a high level. This in turn results in an economic and practical disadvantage.

A primary object of the invention is to overcome those problems mentioned above by providing a novel method and apparatus for controlling line pressure for use with a continuously variable transmission system related to the invention. The invention provides the objective line pressure with a substantially low safety margin without unnecessarily causing line pressure to rise at the initial setting by preventing the entire system from becoming complicated and expensive, in which the control operation is executed so that the line pressure can rise by a specific amount in the presence of the predetermined conditions when the system detects occurrence of slipping of clutch during drive mode, thus securely implementing an ideal and optimum clutch engagement.

To achieve the above object, the invention provides a novel method and apparatus for controlling line pressure of a continuously variable transmission system such transmission system being controlled by either expanding or contracting the width of the channel between a stationary pulley member and a movable pulley member which is contactably and removably set with respect to said stationary pulley member, in order to either expand or contract the radius of the rotation of a belt wound on said pulley members for eventually varying the belt ratio, in which the line-pressure control system causes the line pressure to rise by a specific amount in the presence of predetermined conditions when it detects slipping of the clutch while the drive mode is underway, so that an optimum clutch engagement can securely be implemented.

Advantages of the invention include the following. According to the invention, when the control system detects slipping of the clutch while the drive mode is underway, it causes the line pressure to rise by a specific amount to effectively prevent the clutch from slipping. The invention effectively prevents the clutch from slipping and provides the objective line pressure with a substantially low safety margin, thus securely preventing the line pressure from unnecessarily rising at the initial setting. This in turn minimizes the cost of the entire system.

BRIEF DESCRIPTION OF THE DRAWINGS

FIGS. 1 through 3 respectively denote preferred embodiments of invention wherein:

FIG. 1 is an operation flowchart for controlling line pressure for use with a belt-driven continuously variable transmission system related to the invention;

FIG. 2 is a timing chart denoting the line-pressure control condition; and

FIG. 3 is a block diagram of the belt-driven continuously variable transmission system related to the invention.

DETAILED DESCRIPTION

Figure 1:
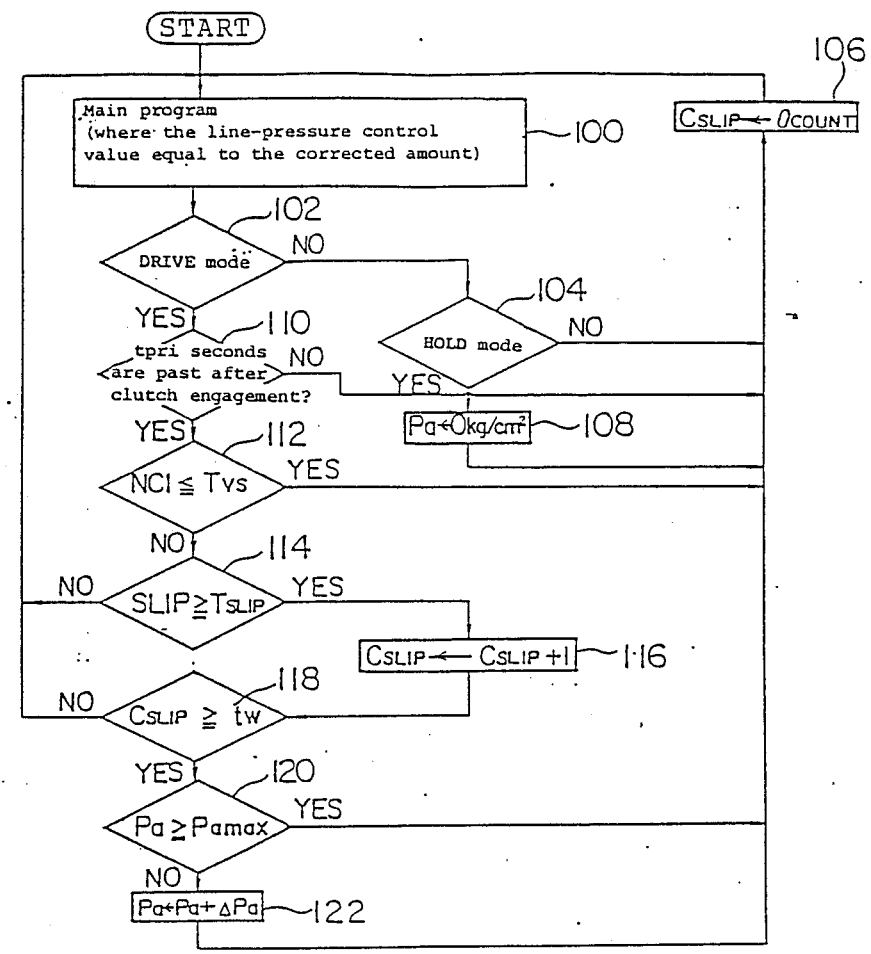

Referring now more particularly to the accompanying drawings, preferred embodiments of the clutch pressure control system for use with the continuously variable transmission system related to the invention are described below.

First, refer to FIG. 3. The continuously variable transmission controls system related to the invention typically incorporates a belt-driven continuously variable transmission 2 including a belt 2A drivingly interconnecting a driving pulley 4 and a driven pulley 10. The driving pulley 4 comprises a driving stationary pulley member 6 and a driving movable pulley member 8. The driven pulley 10 comprises a driven stationary pulley member 12 and a driven movable pulley member 14. In the driving pulley 4 shown in FIG. 3, the driving stationary pulley member 6 is fixed to a revolving shaft 16 and the driving movable pulley member 8 is movable axially along the revolving shaft 16 and mounted to rotate with the shaft 16. First and second housings 18 and 20 are respectively mounted to the driving movable pulley member 8 and the driven movable pulley member 14. These housings 18 and 20 respectively constitute first and second oil-pressure chambers 22 and 24. Energizing means 26, here composed of a spring, extends in the axial direction in the second oil-pressure chamber 24 to press against the second housing 20.

An oil pump 28 is driven by the revolving shaft 16. This oil pump 28 is connected to first and second oil paths 30 and 32. A primary-pressure control valve 34, which is substantially the transmission control valve, is used for controlling primary pressure, i.e., the input shaft sieve pressure, and is interposed intermediate in the first oil path 30. A constant-pressure valve 38, here sized for reducing 5 through 25 kg/cm$^2$ of line pressure to 1.5 through 2.0 kg/cm$^2$ of constant pressure, is connected to the first oil path 30 of the oil pump across the primary-pressure control valve 34 via a third oil path 36 which controls the line pressure mentioned above. A first three-way electromagnetic valve 42 is connected to the primary-pressure control valve 34 via a fourth oil path 40 so that primary pressure can properly be controlled.

A line pressure control valve 44 having a vent-valve function is connected intermediate in the second oil path 32 via a fifth oil path 46 so that line (pump) pressure can properly be connected. A second three-way electromagnetic valve 50 is connected to the line-pressure control valve 44 via a sixth oil path 48. Furthermore, a clutch-pressure control valve 52 is connected intermediate in the second oil path 32 and to the second oilpressure chamber 24 via a seventh oil path 54. A third three-way electromagnetic valve 58 is connected to the clutch-pressure control valve 52 via an eighth oil path 56 so that the clutch pressure can properly be adjusted.

The primary-pressure control valve 34, the first three-way electromagnetic valve 42 which controls the primary pressure, constant-pressure control valve 38, the sixth oil path 48, the second three-way electromagnetic valve 50 which controls the line pressure, and the clutch-pressure control valve 52, are respectively connected to each other via a ninth oil path 60. The clutch-pressure control valve 52 is connected to the oil-pressure driven clutch 62 via a tenth oil path 64. A pressure sensor 68 is connected intermediate of the tenth oil path 64 via an eleventh oil path 66. Pressure sensor 68 directly detects oil pressure when controlling clutch pressure under hold and start modes of the apparatus, thus making a contribution when generating an instruction to apply the detected oil pressure to the objective clutch pressure. In addition, since the clutch pressure is equivalent to the line pressure during the drive mode of the apparatus, direct detection of oil pressure also makes a contribution to the control of line pressure.

A controller unit 70 is also provided for the clutch pressure control system. The controller unit 70 causes the clutch-pressure duty ratio to vary on receipt of data signals related to the throttle aperture of carburetor (not shown) of the vehicle. The controller unit 70 also rules the opening and closing operations of the first three-way electromagnetic valve 42 which controls the primary pressure, the constant-pressure controller 38, the second three-way electromagnetic valve 50 which controls the line pressure, the third three-way electromagnetic valve 58 which controls clutch pressure, and the operation of the pressure sensor 68, respectively.

Next, functions of various signals delivered to the controller unit 82 are described below.

1. Shift-lever position detection signal

This signal controls line pressure, ratios and operation of the clutch needed for implementing those modes including P, R, N, D, and L by activating signals related to these operational modes.

2. Carburetor throttle aperture detection signal

This signal detects engine torque in reference to memory content preliminary input to programs and determines either the objective duty ratio or the objective number of the revolutions of the engine.

3. Carburetor idling position detection signal

This signal compensates for the operation of carburetor throttle aperture sensor and then improves the control accuracy.

4. Accelerator pedal position detection signal

This signal detects the intention of the driver by referring to the condition of the depressed accelerator pedal and then determines the direction of control when the driver starts to move the vehicle or during run.

5. Brake signal

This signal detects whether the driver has depressed the brake pedal, or not. If depressed, then, the brake signal determines the direction of implementing controllike disengagement of the clutch for example.

6. Optional power mode selection signal

This signal allows the driver to optionally select sporty performance or economical run of the vehicle.

The oil-pressure driven clutch 62 includes a piston 72, a ring-shaped spring 74, a first pressurizing plate 76, a friction plate 78, a second pressurizing plate 80, an oil pan 82, and an oil filter 84, respectively.

The primary-pressure control valve 34 is of the known type provided with a body unit and a spool valve (not shown) which reciprocates inside of the body unit.

When identifying the slipping of the oil-pressure-driven clutch 62 during the drive mode, the controller 70 causes the line pressure to rise by a specific amount in presence of predetermined conditions. In other words, when the following four conditions are fully satisfied subsequent to the detection of slipping of the oil-pressure-driven clutch 62 during drive mode, the controller unit 70 causes line pressure to rise by a specific amount, i.e., by Pa of the correctable amount, so that control operation can be executed to materialize the optimum clutch engagement. Those four conditions (see FIGS. 1 and 2) include the following:

(1) Passage of a certain period of time (tpri seconds) after completing the engagement of the oil-pressure-driven clutch 62.
(2) Movement of the vehicle at a certain velocity other than a specifically low speed below the predetermined vehicle speed which causes slipping to occur in order that the engaged condition of clutch 62 can securely be known.
(3) Slipped rate of clutch 62 is identified above the lower limit (TSLIP).
(4) Slipping lasted for a specific period of time (tw).

The controller unit 70 identifies the presence of the drive mode when the following conditions are present.

(1) Shift lever is at any of those positions R, D, or L.
(2) Clutch output shaft rotates (i.e., the vehicle runs) at a minimum of 8 km/h.
(3) Clutch 62 slips by a maximum of 20 r.p.m.

To detect the slipping of the oil-pressure-driven clutch 62, a gear 86 (which detects the rotation of the output shaft) is provided outside of the driven movable pulley member 14. In addition, a first rotation detector 88 for the output shaft is set to a position close to the external periphery of gear 86. The clutch 62 is also provided with an output-transmitting gear 90. A second rotation detector 92 (which detects the rotation of the final output shaft) is provided in a position close to the external periphery of the output-transmitting gear 90. Thus, the slipped amount of the clutch 62 is detected by the combined function of the first and second rotation detectors 88 and 92.

Next, operation of the clutch control system is described below.

Primary-pressure control valve 34, line-pressure control valve 44, and clutch-pressure control valve 52 are respectively controlled by oil pressure output from the first through third three-way electromagnetic valves 42, 50, and 58. The oil pressure which controls these electromagnetic valves 42, 50, and 58 is the substantially constant oil pressure generated by the constant-pressure control valve 38. The control oil pressure is substantially lower than the line pressure, but it is a quite stable constant pressure. The control oil pressure is also introduced to primary-pressure control valve 34, line-pressure control valve 44, and the clutch-pressure control valve 52 in order that performances of these can be stabilized.

Next, operation in conjunction with electronic control of the belt-driven continuously variable transmission system is described below. Operation of the belt-driven continuously variable transmission system is controlled by oil pressure. In addition, in response to the instruction from the controller unit 70, the line pressure needed for supporting the belt and transmitting engine torque, the primary pressure needed for varying the belt ratio, and the clutch pressure needed for securely engaging clutch 62, are properly provided.

Note that codes appearing in the following operation description are defined immediately below.

CSLIP: The value which counts the direction in which slipping took place with the oil-pressure-driven clutch 62.
NCI: Clutch input speed.
Pa: Optimum amount for correcting line pressure
SLIP: $|NCI-NCO|/NCI$, where NCO denotes the clutch output speed.
TSLIP: Trigger value which determines that slipping takes place with the clutch when SLIP >TSLIP.
TVS: Vehicle-speed trigger which does not execute clutch-pressure matching operation when NCI <TVS.
tpri: Trigger which does not execute clutch-pressure matching operation for a specific period of time after completion of the engagement of clutch 62.
tw: Trigger which identifies that slipping has taken place with the clutch 62 for a specific period of time.
PLINSP: The objective line pressure.
THR: The carburetor throttle aperture.
NE: The number of engine revolutions.

Figure 2:
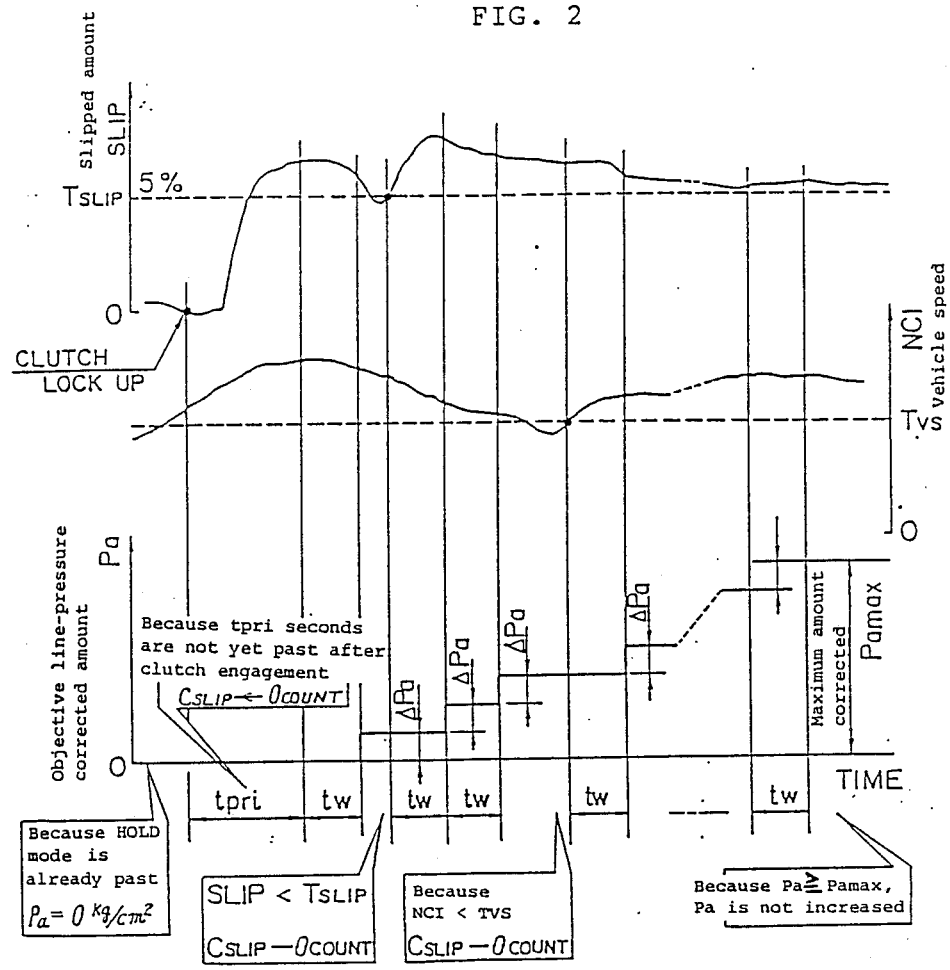

Referring now to FIG. 1, the line-pressure controlling flowchart, operating steps for executing the control of line-pressure condition are described below.

When the driver starts off the vehicle, step 100 is entered so that execution of the main program can be started, in which the controller unit 70 properly adjusts the line pressure Pa by implementing correction with an expression PLINSP=$f$ (THR, NE, NCI)+Pa. Then, operation mode enters into step 102, where the controller unit 70 checks to see if the drive mode is activated, or not. If the drive mode is not yet activated, then, step 104 is entered, where the controller unit 70 checks to see if a "hold" mode is activated, or not. If the controller unit 70 sees that the hold mode is not underway, then step 106 is entered, where the counted value (CSLIP) in conjunction with the duration of the clutch slipping is reset. Conversely, if the hold mode is already underway, then step 108 is entered, where the amount for adequately correcting the line pressure (Pa) is reduced to 0 kg/cm$^2$ to restore execution of step 106 to fully reset the counted value (CSLIP). The "hold" mode is one in which clutch pressure is held low in order that clutch can slightly remain in contact with the clutch pressure, as when the driver has no intention to start off the vehicle by inactivating throttle with the shift position being set to D or R, or as when the driver intends to turn off engine torque by reducing the vehicle speed during running.

If the controller unit 70 identifies the presence of the drive mode while step 102 is underway, then step 110 is entered, where the controller unit 70 checks to see if a certain period of time (such as tpri seconds for example) is already past after engagement of clutch 62. If the predetermined period of time is not yet past, then, step 106 is again entered, where the counted value (CSLIP) is reset. Conversely, if the predetermined period of time is already past, then, step 112 is entered, where the controller unit 70 checks to see if the clutch input speed (NCI) is below a vehicle-speed trigger (TVS) of a predetermined value, or not. If it is identified in the positive way, then, step 106 is again entered, where the counted value (CSLIP) is reset. Conversely, if it is identified in the negative way, step 114 is entered, where the controller unit 70 checks to see if the amount of slipping (SLIP) that took place with clutch 62 is more than the lower-limit amount (TSLIP), or not. If the slipped amount of clutch 62 is not more than the lower-limit amount (TSLIP), then step 100 is resumed. If the slipped amount of clutch exceeds the lower-limit amount (TSLIP), then step 116 is entered, where the controller unit 70 adds a value 1 to the counted value (CSLIP) so that the addup counted value (CSLIP) can be stored in memory means. Next, step 118 is entered, where the controller unit 70 checks to see if the duration of slipping in conjunction with the addup counted value (CSLIP) lasts for more than the predetermined period of time (tw), or not. If it is identified in the negative way, step 100 is again entered so that the main program can be executed over again. If it is identified in the positive way, then, step 120 is entered, where the controller unit 70 checks to see if the optimum amount for correcting the line pressure (Pa) exceeds the maximum correctable amount (Pamax), or not. If it is identified in the positive way, then, step 106 is again entered, where the addup counted value (CSLIP) is reset. Conversely, if it is identified in the negative way, then the controller unit 70 adds the correctable amount (Pa) to the optimum amount (Pa) for correcting the line pressure so that the addup optimum amount (Pa) for correcting the line pressure can be stored in memory means before eventually allowing the operating mode to again enter into step 106 for resetting the addup counted value (CSLIP).

As a result, the controller unit 70 properly controls clutch pressure so that clutch pressure can be increased by a specific amount at the moment when the following conditions are present.

(1) A specific period of time is past after completing engagement of the oil-pressure-driven clutch 62.
(2) The vehicle runs at a certain speed other than a specific low-speed which is below the predetermined level.
(3) Slipping occurs by a specific amount which is more than the lower limit rating.
(4) The controller unit 70 detects that the oil-pressure-driven clutch 62 incurs slipping for a specific period of time while the drive mode is underway.

Consequently, the continuously variable transmission system related to the invention securely provides the objective line pressure with a very low safety margin without unnecessarily raising the line pressure at the initial setting. The line-pressure control system related to the invention minimizes the amount of work needed for executing closed-loop control by constituting the objective line pressure with the actual line pressure, thus offering an economic advantage as well.

Furthermore, the line-pressure control system related to the invention dispenses with any additional hardware for controlling clutch pressure, and yet the control operation can be executed merely by applying hardware means, and thus there is no need of adding up a substantial volume of program. This effectively prevents complication of the system and saves cost.

Since the line-pressure control system provides the objective line pressure with a very low safety margin by ideally controlling clutch pressure, it securely prevents excessive engagement of the oil-pressure-driven clutch, thus effectively preventing clutch from incurring wear and burn, and yet extending service life as well. The effect of the invention can be summarized as follows. As is clear from the foregoing description, according to the invention, control of line pressure is executed by raising the line pressure by a specific amount in presence of predetermined conditions when the control system detects slipping of clutch during drive mode, so that optimum engagement of clutch can securely be implemented. To achieve this, the control system provides the objective line pressure with a very low safety margin. Since there is no need of excessively raising line pressure at the initial setting stage, and yet it is possible for the control system to minimize the amount of work for executing closed-loop control operation before making up the objective line pressure with the actual line pressure, thus offering an economic advantage. The line-pressure control system of the invention dispenses with any additional hardware, and yet control operation can be executed merely by applying hardware means. This eliminates the need for adding substantial amounts of program, thus preventing the control system from complication and saving cost. Since the line-pressure control system provides the objective line pressure with a very-low safety margin by ideally controlling clutch pressure, it dispenses with excessive engagement of the oil-pressure-driven clutch, thus securely preventing clutch from incurring wear and burn, and at the same time extending service life.

Although a particular preferred embodiment of the invention has been disclosed in detail for illustrative purposes, it will be recognized that variations or modifications of the disclosed apparatus, including the rearrangement of parts, lie within the scope of the present invention.

The embodiment of the invention in which an exclusive property or privilege is claimed are defined as follows:

1. A method of controlling line pressure of a continuously variable transmission system, said transmission system being controlled by either expanding or contracting the width of the channel between a stationary pulley member and a movable pulley member which is movable toward and away from said stationary pulley member in order to either expand or contract the radius of rotation of a belt wound on said pulley members for eventually varying the transmission ratio, in which the method includes the steps of: controlling line pressure by raising it by a specific amount in the presence of predetermined conditions when slipping of a clutch is detected during a drive mode so that optimum clutch engagement can eventually be implemented; and detecting of said presence of said predetermined conditions, said detecting step including the steps of:

detecting of the occurrence of slipping of said clutch during said drive mode at a specific slipping rate higher than a lower limit value, and detecting that the duration of said clutch slipping lasts for a specific period of time after passing of a certain period from the engagement of the clutch when the vehicle runs at a speed other than at a specific low speed below a predetermined velocity.

2. A continuously variable transmission system, comprising: a pulley incorporating a stationary pulley member and a movable pulley member and a belt received in a channel therebetween.

means for either expanding or contracting the width of the channel between the stationary pulley member and the movable pulley member which is movable toward and away from said stationary pulley member, in order to either expand or contract the radius of the rotation of the belt wound on said pulley members for eventually varying the transmission ratio;

a line pressure responsive clutch connecting one of said pulley members to a shaft;

means for controlling said line pressure by raising it by a specific amount in the presence of predetermined conditions when slipping of a clutch is detected during a drive mode of the transmission system so that optimum clutch engagement can eventually be implemented;

means for detecting occurrence of slipping of said clutch during said drive mode at a specific slipping rate higher than a lower limit value; and means for detecting a duration of said slipping effect for a specific period of time after passing of a certain period from the engagement of the clutch when the vehicle runs at a speed other than a specific low speed below a predetermined velocity.

3. A method of controlling a continuously variable transmission of a vehicle, said transmission having an input shaft, having an output shaft, having clutch means for selectively effecting and interrupting driving coupling of said input shaft to said output shaft, the degree of engagement of said clutch means varying in dependence on the value of a control fluid pressure supplied to said clutch means, and having ratio control means for varying a drive ratio between said input shaft and said output shaft within a range which includes a predetermined ratio corresponding to a drive mode, said method including the steps of: setting said ratio control means to said predetermined ratio corresponding to said drive mode; setting said control fluid pressure to a pressure value; thereafter checking for slipping of said clutch means; and effecting a step-like increase in said control fluid pressure in response to detection of clutch slip in excess of a predetermined value; and including the step of detecting whether said clutch slip in excess of said predetermined value has been present for a predetermined time interval, and carrying out said step of effecting said step-like increase in said control fluid pressure when said clutch slip in excess of said predetermined value has been present for said predetermined time interval.

4. A method as recited in claim 3, including after said step of effecting said step-like increase the step of effecting a further step-like increase in response to detection of clutch slip in excess of said predetermined value being present for a further predetermined time interval subsequent to said firstmentioned time interval.

5. A method as recited in claim 4, wherein said steps of effecting said step-like increases include the step of preventing said control fluid pressure from exceeding a predetermined maximum value.

6. A method of controlling a continuously variable transmission of a vehicle, said transmission having an input shaft, having an output shaft, having clutch means for selectively effecting and interrupting driving coupling of said input shaft to said output shaft, the degree of engagement of said clutch means varying in dependence on the value of a control fluid pressure supplied to said clutch means, and having ratio control means for varying a drive ratio between said input shaft and said output shaft within a range which includes a predetermined ratio corresponding to a drive mode, said method including the steps of: setting said ratio control means to said predetermined ratio corresponding to said drive mode; setting said control fluid pressure to a pressure value; thereafter checking for slipping of said clutch means; and effecting a step-like increase in said control fluid pressure in response to detection of clutch slip in excess of a predetermined value; and including the step of determining whether said clutch has been engaged for a predetermined time interval, and carrying out said step of effecting said step-like increase at a point in time after said clutch has been engaged for said predetermined time interval.

7. A method of controlling a continuously variable transmission of a vehicle, said transmission having an input shaft, having an output shaft, having clutch means for selectively effecting and interrupting driving coupling of said input shaft to said output shaft, the degree of engagement of said clutch means varying in dependence on the value of a control fluid pressure supplied to said clutch means, and having ratio control means for varying a drive ratio between said input shaft and said output shaft within a range which includes a predetermined ratio corresponding to a drive mode, said method including the steps of: setting said ratio control means to said predetermined ratio corresponding to said drive mode; setting said control fluid pressure to a pressure value; thereafter checking for slipping of said clutch means; and effecting a step-like increase in said control fluid pressure in response to detection of clutch slip in excess of a predetermined value; and including the step of determining whether said input shaft is rotating at a speed above a predetermined speed, and carrying out said step of effecting said step-like increase only when said input shaft is rotating at a speed above said predetermined speed.

8. A method of controlling a continuously variable transmission of a vehicle, said transmission having an input shaft, having an output shaft, having clutch means for selectively effecting and interrupting driving coupling of said input shaft to said output shaft, the degree of engagement of said clutch means varying independence on the value of a control fluid pressure supplied to said clutch means, and having ratio control means for varying a drive ratio between said input shaft and said output shaft within a range which includes a predetermined ratio corresponding to a drive mode, said method including the steps of: setting said ratio control means to said predetermined ratio corresponding to said drive mode; setting said control fluid pressure to a pressure value; thereafter checking for slipping of said clutch means; and effecting a step-like increase in said control fluid pressure in response to detection of clutch slip in excess of a predetermined value; and including the steps of determining whether said clutch has been engaged for a predetermined time period and determining whether clutch slip in excess of said predetermined value has been continuously present for a predetermined time interval subsequent to said predetermined time period while said clutch remains continuously engaged.

9. A method as recited in claim 8, wherein said step of effecting said step-like increase includes the step of determining whether the speed of said input shaft is above a predetermined speed, and effecting said step-like increase only if the speed of said input shaft remains above said predetermined speed for said predetermined time interval.

* * * * *